Sept. 18, 1923.  W. T. MARABLE  1,468,244
COTTON CHOPPER
Filed Oct. 28, 1920  3 Sheets-Sheet 2
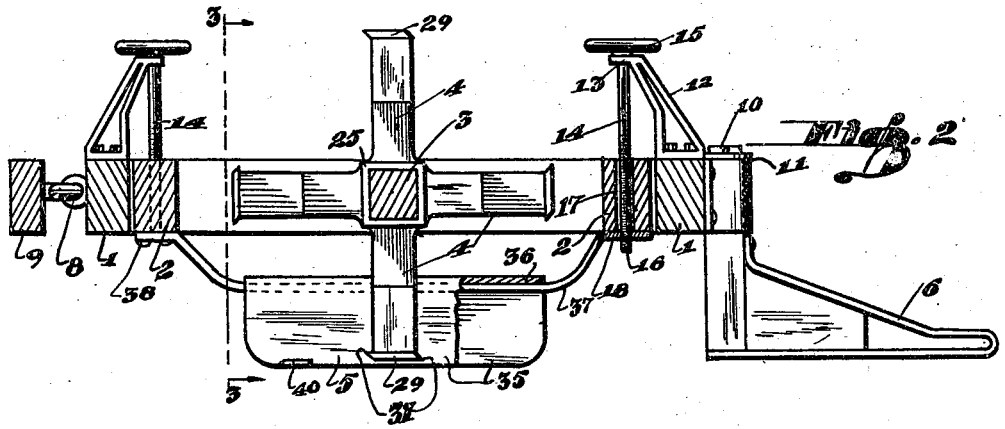
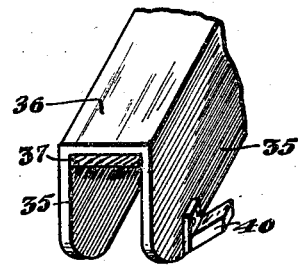
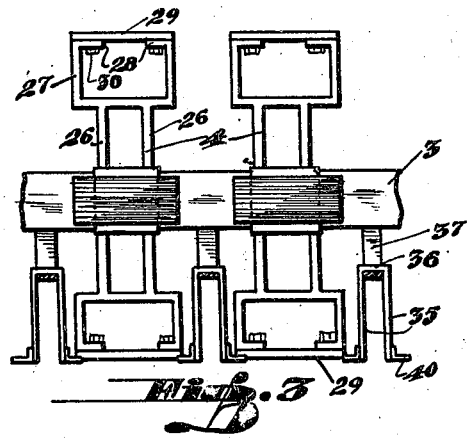
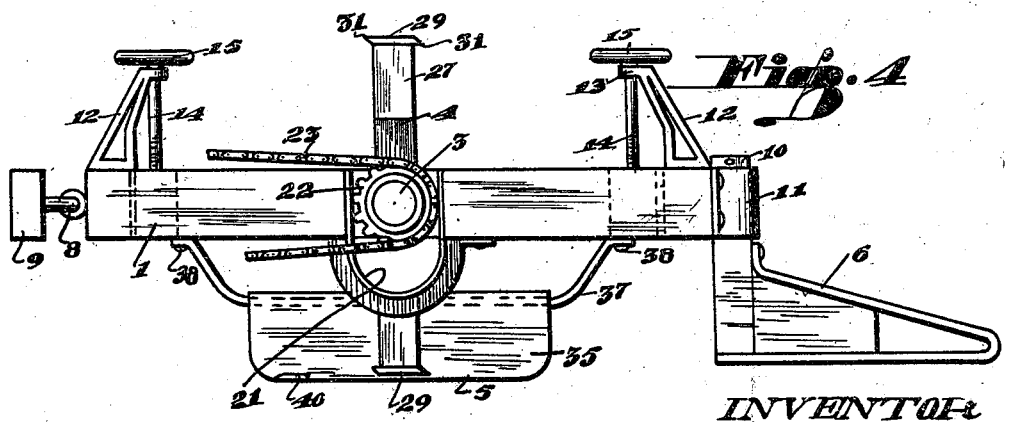
INVENTOR
William T. Marable
by Hazard & Miller
ATT'YS.

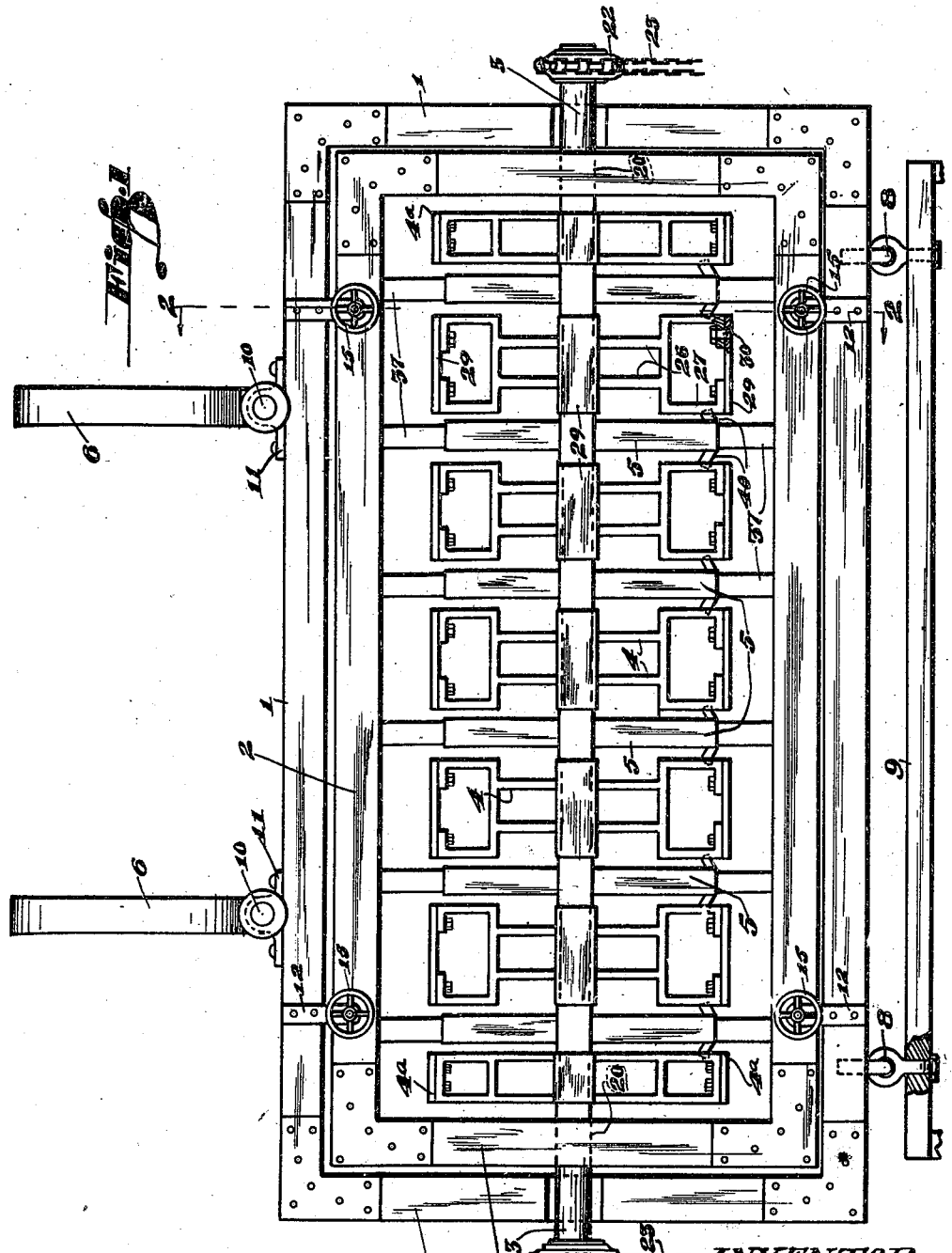

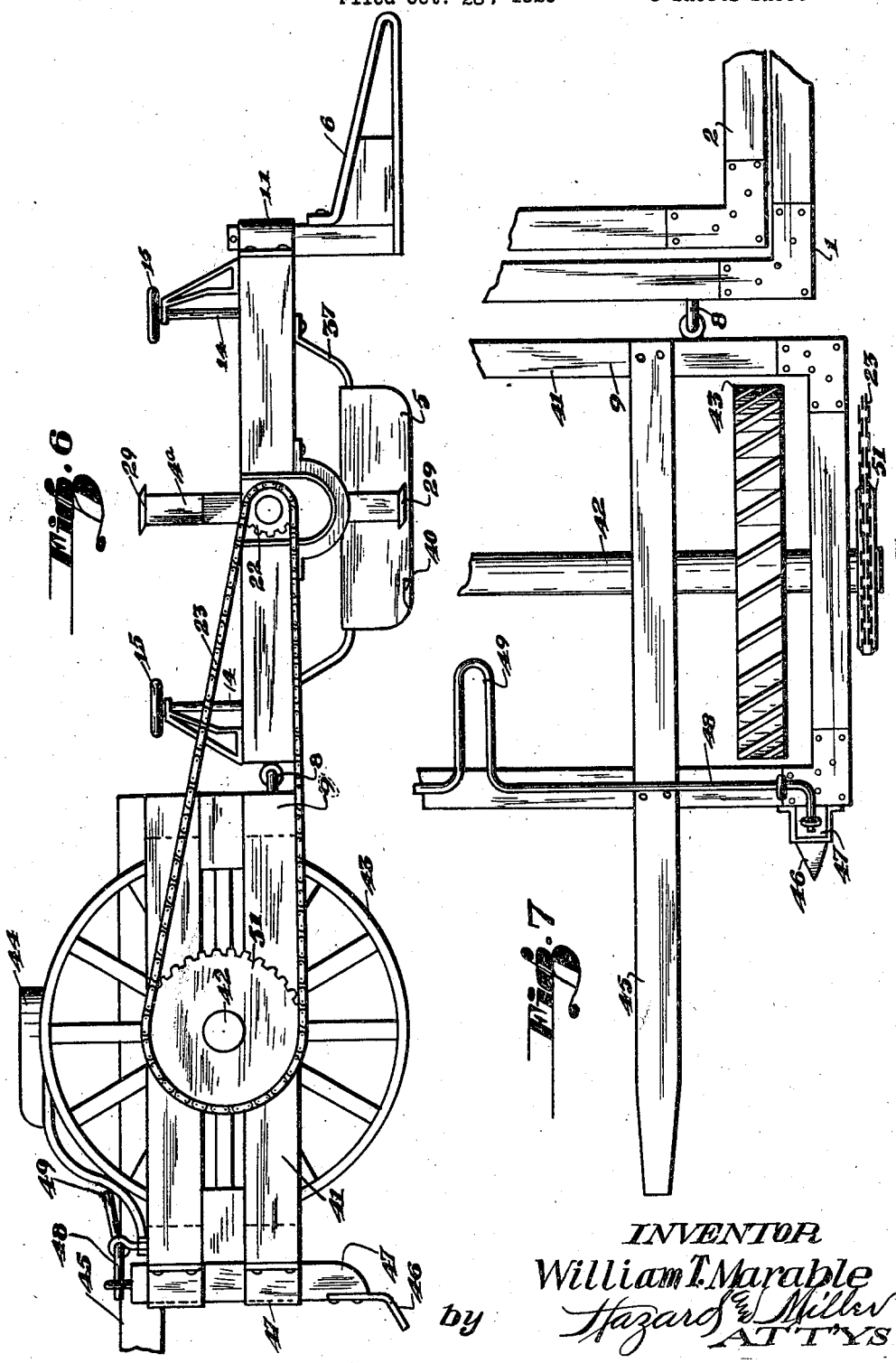

Patented Sept. 18, 1923.

1,468,244

UNITED STATES PATENT OFFICE.

WILLIAM T. MARABLE, OF EL CENTRO, CALIFORNIA.

COTTON CHOPPER.

Application filed October 28, 1920. Serial No. 420,247.

*To all whom it may concern:*

Be it known that I, WILLIAM T. MARABLE, a citizen of the United States, residing at El Centro, in the county of Imperial and State of California, have invented new and useful Improvements in Cotton Choppers, of which the following is a specification.

It is the object of this invention to provide a cotton chopper which will form an efficient machine whereby cotton may be thinned out, the machine also forming means for protecting the cotton which is left standing.

The invention will be readily understood from the following description of the accompanying drawings, in which—

Figure 1 is a plan view of a chopper constructed in accordance with the invention.

Fig. 2 is a vertical section through the same on the line 2—2 of Fig. 1.

Fig. 3 is a detail section on the line 3—3 of Fig. 2.

Fig. 4 is a side elevation of the chopper.

Fig. 5 is a detail perspective view of one of the plant protectors of the machine.

Fig. 6 is a side elevation of the cotton chopper and a traction device for the same.

Fig. 7 is a fragmentary plan view of the traction device.

The chopper consists essentially of a frame 1 adapted to be drawn by any suitable power and having a frame 2 vertically adjustable within the same. The frame 2 carries a rotating shaft 3 carrying chopper arms 4. The chopper arms are transversely spaced across frame 2, and plant protectors 5 are arranged between the choppers. The rear end of frame 1 is supported by skids 6.

Referring in detail to the embodiment of the invention illustrated, frame 1 is shown as a rectangular frame connected at its front end by eye bolts 8 to a cross bar 9 of a suitable traction device. The skids 6 supporting the rear end of frame 1 are shown as projecting in rear of said frame and are mounted upon vertical bearing pins 10 which are received in suitable bearing brackets 11 extending rearwardly from the frame 1.

The frame 2 is also shown as a rectangular frame fitting within frame 1 and arranged for vertical movement relative to the same. The means for adjusting frame 2 relative to frame 1 may include brackets 12 projecting from frame 1 over the frame 2 and forming bearings 13 for screw bolts 14. These screw bolts may be provided with hand wheels 15 above the bearings of brackets 12 and the depending threaded ends 16 of said bolts are received through suitable apertures 17 extending through frame 2. Nuts 18 are mounted upon the frame 2 and the bolts 16 are threaded through these nuts so that rotation of the hand wheels 15 will raise and lower frame 2 with relation to frame 1.

The shaft 3 is shown as a squared shaft having rounded end portions 20 journaled in frame 2. The ends of the shaft project beyond frame 2 through suitable vertically elongated bearings 21 arranged to accommodate the shaft as the latter is raised and lowered with frame 2 relative to frame 1. Sprocket wheels 22 are provided upon the ends of the shaft beyond frame 1 and sprocket chains 23 are received over these sprocket wheels. The sprocket chains may be driven by any suitable rotating means, preferably, a part of the traction device.

Choppers mounted upon the shaft 3 within frame 2 are shown as each comprising a hub 25 fixed upon shaft 3 and having the radially extending spaced arms 26. A U-shaped bracket 27 is fixed upon the arms 26 with the arms of said bracket projecting radially and terminating in inwardly turned ends 28. A cutter blade 29 is mounted upon these inwardly turned ends of bracket 27 and may be fixed thereto by means of bolts 30. Knife edges 31 are provided at the opposite edges of blades 29 so that when one edge of the blade has become dull the blade may be reversed upon its supporting bracket and the opposite edge of the same thereby brought into operative position. The choppers are spaced transversely along shaft 3 so that a space is left between blades of adjacent choppers which is of a width slightly greater than the cotton plants which it is desired to leave along rows of said plants.

The protectors arranged between adjacent choppers include side walls 35 extending downwardly so as to rest upon the ground and connected to a top 36 so spacing the side walls as to permit the cotton left standing to be received within the protector thus formed. The protectors may be supported in position by strips 37 extending through the same with the tops 36 resting upon said strips and the ends of the strips secured to the frame 2 as shown at 38.

The protectors are of just sufficient width to be received over the cotton which is to be left standing, and outwardly projecting blades 40 may extend from side walls 35 at the lower edges of the same in order to clear out the cotton between blades 29 and the side walls of the protectors.

By reference to Fig. 1 it will be noted that the choppers 4ª at the respective ends of the machine are of approximately half the width of the remaining choppers. Thus it will be seen that when in use, the outside paths cut by the chopper through the standing cotton, will be half the width of the intermediate paths. By this arrangement after the cotton chopper has moved across a field, it will be noted that upon the return travel of the chopper its path of travel may be guided by running one of the choppers 4ª along the path of half width cut at the previous travel of the chopper across the field. A path of full width will thus be cut at the meeting edges of succeeding cuts across a field and at the same time ready means will be afforded for guiding the chopper with relation to the next preceding cut.

As previously stated the cotton chopper may be drawn by any suitable traction device, but in practice it will be found expedient to draw the chopper by means of an animal drawn carriage such as is illustrated in Figs. 6 and 7. This carriage is shown as including a rectangular frame 41 carrying the axle 42 upon which is mounted the wheels 43. A driver's seat 44 may be mounted upon the frame and shafts 45 or a suitable tongue may project forwardly from the frame in order to form a usual hitch for draft animals.

Shoes 46 are arranged in brackets 47 at the front of the frame in order to cut furrows in which the wheels are adapted to run. These shoes are, preferably, vertically adjustable in their brackets by means of a rock shaft 48 journaled upon the carriage frame and suitably connected to the shoes. The rock shaft may be provided with an actuating lever 49. As shown in the drawings the carriage for drawing the cotton chopper may be connected to the cotton chopper by the eye bolt connection 8 secured to the rear of the carriage frame and to the front of frame 1 of the cotton chopper. The sprocket chains 23 which are received over the sprocket wheels 22 may be actuated from the carriage for drawing the chopper as by means of sprocket wheels 51 fixed upon the axle 42, the sprocket chains being received over said sprocket wheels, as clearly illustrated in Fig. 6.

Various changes may be made without departing from the spirit of the invention as claimed.

What is claimed is:

1. A cotton chopper comprising a frame, a plurality of transversely spaced rotatable chopping members carried by said frame, the endmost members being of less width than the intermediate members, and means for actuating all of the members.

2. A cotton chopper including a plurality of transversely spaced rotatable chopping members, plant protectors arranged between said chopping members, and cutter blades extending transversely from said plant protectors.

3. In combination, a movable chopping member, a plant protector associated with the member, and stationary cutting means carried by the protector for the purpose described.

4. A cotton chopper comprising a plurality of chopping members, plant protectors arranged between the members, and cutter blades on the protectors at points in advance of the chopping members.

5. A cotton chopper comprising a supporting frame, an adjustable frame within the supporting frame, a shaft journaled in the adjustable frame and movable vertically in the supporting frame, screws carried by the supporting frame and engageable with the adjustable frame to vary the vertical position of the latter, chopping members secured to said shaft, and plant protectors supported by the adjustable frame interposed between the chopping members.

In testimony whereof I have signed my name to this specification.

WILLIAM T. MARABLE.